(12) United States Patent
Weida et al.

(10) Patent No.: US 10,020,724 B2
(45) Date of Patent: Jul. 10, 2018

(54) DUTY-RATIO CONTROLLER (71) Applicant: DET International Holding Limited, George Town, Grand Cayman (KY)

(72) Inventors: Daniel Weida, Munich (DE); Matthias Staehli, Thierachern (CH)

(73) Assignee: DET INTERNATIONAL HOLDING LIMITED, George Town, Grand Cayman (KY)

( * ) Notice: Subject to any disclaimer, the term of this patent is extended or adjusted under 35 U.S.C. 154(b) by 49 days.

(21) Appl. No.: 14/645,089

(22) Filed: Mar. 11, 2015

(65) Prior Publication Data
US 2015/0263609 A1  Sep. 17, 2015

(30) Foreign Application Priority Data

Mar. 12, 2014  (EP) ................................. 14405022

(51) Int. Cl.
*H02M 7/68*   (2006.01)
*H02M 1/42*   (2007.01)
*H02M 3/156*  (2006.01)
*H02M 1/00*   (2006.01)

(52) U.S. Cl.
CPC ....... *H02M 1/4208* (2013.01); *H02M 1/4225* (2013.01); *H02M 3/156* (2013.01); *H02M 2001/0025* (2013.01); *Y02P 80/112* (2015.11)

(58) Field of Classification Search
CPC ............................. Y02B 70/126; H02M 3/156
USPC ................................... 363/89; 323/207, 222
See application file for complete search history.

(56) References Cited

U.S. PATENT DOCUMENTS

| | | | |
|---|---|---|---|
| 6,295,216 B1* | 9/2001 | Faria | H02M 1/12 307/105 |
| 7,088,081 B2* | 8/2006 | Takahashi | H02M 1/4225 323/222 |
| 7,894,216 B2* | 2/2011 | Melanson | H02M 1/4225 323/222 |
| 2010/0253313 A1 | 10/2010 | Herzer et al. | |

(Continued)

FOREIGN PATENT DOCUMENTS

WO   WO 2009/016898 A1   2/2009

OTHER PUBLICATIONS

Chen et al., "Digital Control for Improved Efficiency and Reduced Harmonic Distortion over Wide Load Range in Boost PFC Rectifiers", Power Electronics, IEEE, 2009, pp. 760-766.

(Continued)

*Primary Examiner* — Nguyen Tran
(74) *Attorney, Agent, or Firm* — Birch, Stewart, Kolasch & Birch, LLP (57) ABSTRACT

A controller for determining the duty-ratio for a pulse width modulator of a converter includes an inner current loop, an outer voltage loop and a multiplier with an input voltage feed forward to connect both loops. A prediction unit determines a correction signal $i_{cor}$ that is added to the reference current $i_{ref}$ by means of an adder and it further determines a sample correction signal to correct the current samples in the current loop. This error-controlled duty-ratio prediction with sample correction results in an improved total harmonic distortion as well as in an improved power factor of the converter.

19 Claims, 3 Drawing Sheets

(56) References Cited

U.S. PATENT DOCUMENTS

| | | | |
|---|---|---|---|
| 2010/0302818 A1* | 12/2010 | Chang ................ | H02M 1/4225 363/80 |
| 2011/0096576 A1* | 4/2011 | Takahashi ........... | H02M 1/4225 363/44 |
| 2013/0279204 A1 | 10/2013 | Yang et al. | |
| 2014/0043866 A1 | 2/2014 | Zhao et al. | |

OTHER PUBLICATIONS

Gusseme et al., "Digital Control of Boost PFC Converters Operating in both Continuous and Discontinuous Conduction Mode", 35th Annual IEEE Power Electronics Specialists Conference, 2004, pp. 2346-2352.

Morroni et al., "Adaptive Tuning of Switched-Mode Power Supplies Operating in Discontinuous and Continuous Conduction Modes", Power Electronics, IEEE Transactions, Nov. 2009, vol. 24, No. 11, pp. 2603-2611.

\* cited by examiner

DUTY-RATIO CONTROLLER

TECHNICAL FIELD

The invention relates to a controller for determining a duty-ratio for a pulse width modulator of a switching power conversion device, including a voltage controller adapted to determine a voltage controller output based on a reference voltage and a voltage feedback signal from a power output of the switching power conversion device and a current controller adapted to determine the duty-ratio. The invention further relates to a method for determining a duty-ratio for a pulse width modulator of a switching power conversion device and a corresponding switching power conversion device.

BACKGROUND ART

Converters are usually used to convert electrical energy from one form to another. Converter topologies can for example be classified as boost, buck or buck-boost converters where all three topologies can be implemented as a DC to DC or an AC to DC converter. Unless otherwise mentioned, the terms boost converter, buck converter and buck-boost converter as used in this description shall include the DC/DC topologies as well as the AC/DC topologies.

AC/DC boost converters are often used for power factor correction (PFC) in the first stage of a multi-stage switch mode power converter. Such boost converters are usually designed to work either in discontinuous (DCM) or continuous conduction mode (CCM). Since the gain of the current control loop shifts considerably between those modes, a mixed conduction mode (MCM) leads to current steps at transitions which negatively affect the harmonic distortion of the input current. On the other side, mixed mode operation results in a higher efficiency with comparable magnetics sizes especially for medium and higher power levels.

Such an AC/DC boost converter is employed to transfer energy from an AC supply network to its output such that the current follows the input voltage. Either analogue or digital controller designs may be employed to control such converters. Known controller designs often include an inner current loop, an outer voltage loop and possibly also a multiplier with an input voltage feed forward to connect both loops.

The document "Digital Control of Boost PFC Converters Operating in both Continuous and Discontinuous Conduction Mode" (Gusseme et al.; 35$^{th}$ Annual IEEE Power Electronics Specialists Conference, Aachen 2004, p 2346-2352) deals with a digital control of boost PFC converters that can be operated in continuous conduction mode (CCM) as well in discontinuous conduction mode (DCM). In order to avoid input current distortion when switching between CCM and DCM a duty-ratio feed-forward is suggested where the optimal duty-ratio is calculated as a combination of the duty-ratios for both conduction modes and then added to the output of the controller. However, since the feed-forward signal is added only after the current compensator, the controller is not immune to noise wherefore it may not be used in commercial products.

The document "Digital control for improved efficiency and reduced harmonic distortion over wide load range in boost PFC rectifiers" (Chen et al.; 2009; Power Electronics, IEEE) discloses another controller for a boost PFC rectifier employing a predictive current control technique for CCM operation. It is suggested to modify this control technique for DCM operation by introducing a current correction factor. By adding an auxiliary inductor winding and a voltage comparator for detecting zero crossings of the inductor voltage a simple calculation of the correction factor is enabled. The suggested solution however results in a complex additional network increasing not only the volume but also the costs of such a controller.

The document "Adaptive tuning of switched-mode power supplies operating in discontinuous and continuous conduction modes" (Morroni et al.; 2009; Power Electronics, IEEE Transactions, p. 2603-2611) discloses an adaptive controller for SMPS, in particular for transitions between CCM and DCM operation. A Digital Stability Margin Monitor feeds a square signal into the closed loop between the compensator and the PWM where the frequency of this square signal is chosen such that the crossover frequency equals its frequency. The loop gain phase margin is measured and the adaptive controller determines the comparator coefficients such that these frequencies meet the desired values.

The known controller designs typically have a dissatisfying total harmonic distortion (THD) and/or power factor (PF), are prone to noise and/or are complex in design and expensive.

SUMMARY OF THE INVENTION

It is the object of the invention to create a controller pertaining to the technical field initially mentioned, having an improved THD and PF, being simple in design and may be implemented with low cost hardware. It is a further object of the invention to provide a corresponding switching power conversion device as well as a corresponding method for determining the duty-ratio for a pulse width modulator of such a switching power conversion device.

The solution of the invention regarding the controller is specified by the features of claim 1. A controller for determining the duty-ratio for a pulse width modulator (PWM) of a switching power conversion device includes a voltage controller adapted to determine a voltage controller output based on at least one of a reference voltage and a voltage feedback signal from the power output of the switching power conversion device and a current controller (also denoted as current compensator) adapted to determine the duty-ratio. According to the invention the controller further includes a prediction unit that is adapted to determine a correction signal and an adder adapted to determine an adder output based on the correction signal and the voltage controller output. In connection with the adder, the term "based on" means that the adder adds the correction signal either directly to the voltage controller output or to another signal derived from the voltage controller output (as for example outlined below for the case where a multiplier is provided).

Further, the current controller is adapted to determine the duty-ratio based on the adder output and a current feedback signal from the power output and the correction signal is determined based on the duty-ratio, i. e. on the output of the current controller.

Although the prior art mentioned above is mostly directed to AC/DC converters, the invention also encompasses controllers for DC/DC converters.

The reference voltage is the voltage that the power conversion device should follow. It is usually given by an external device such as a superior controller, for example of a following converter stage. But it is also possible that the reference voltage, or a value representing the reference voltage, is determined or provided by the controller itself.

By employing such an error controlled duty-ratio (also called duty-cycle) prediction with a feedback loop for the current duty-ratio, the next duty-ratio is dynamically corrected, which results in an improved THD as well as in an improved PF. The controller according to the invention is based on known controller designs where just some further functionality is added. It can therefore be realised based on existing solutions which is very cost effective.

In the case of a DC/DC converter the voltage controller output is, as described above, usually fed directly to the current controller input after adding the correction signal to it. In some types of DC/DC converters (for example those including an input voltage feedforward as described below) and in AC/DC converters, the controller preferably further includes a multiplier. This multiplier is adapted to determine a multiplier output based on the voltage controller output, an input voltage of the switching power conversion device and optionally said input voltage feedforward in case of DC/DC converters including such a feedforward. Or in other words, to determine the reference current for the current controller, the multiplier multiplies the voltage controller output and the input voltage.

Accordingly, the adder is adapted to determine the adder output by adding the correction signal to the multiplier output. And the current controller determines the duty-ratio based on the adder output and the current feedback signal from the power output.

In the following and as far as not otherwise mentioned, the term converter is used for designating an SMPS (switched-mode power supply) wherein controllable switches are controlled by PWM control signals.

Such PWM controllers are widely used in boost converters, wherefore the controller is preferably adapted to determine a duty-ratio of an AC/DC boost converter, for example a PFC boost converter.

But as already mentioned, the invention may also be employed in other converter topologies such as either DC/DC or AC/DC boost, buck and buck-boost converters and particularly in PFC-buck and PFC-buck-boost converters.

In a preferred embodiment of the invention, the prediction unit determines the correction signal based not only on the duty-ratio but also based on at least one further signal. This at least one further signal is either the reference voltage or the voltage feedback signal. Additionally considering the reference voltage or the voltage feedback signal allows to determine the correction signal with higher precision. It is of course also possible that both the reference voltage and the voltage feedback signal are used by the prediction unit to determine the correction signal.

In an even more preferred embodiment the prediction unit determines the correction signal further based on the input voltage of the converter.

The ideal duty-ratio depends on many different factors, such as for example the input conductance, the impedance of the output choke of the converter, which is for example the boost choke in the case of a boost converter, the switching frequency and the output and input voltage of the converter.

In order to more accurately determined the duty-ratio, the prediction unit is in a preferred embodiment of the invention adapted to determine the correction signal based on the duty ratio and on both the reference voltage as well as the input voltage of the converter.

In the case of a boost converter, the determination of the predicted duty cycle is usually carried out for a given mode of operation. If the boost converter operates in CCM, the ideal duty cycle dr usually only depends on the input voltage $V_{IN}$ and the output (or boost) voltage $V_{OUT}$ as shown in equation I:

$$d_{\!f\!f}^{ccm} = 1 - \frac{V_{IN}}{V_{OUT}} \qquad (I)$$

If the boost converter operates in DCM, the determination of the ideal duty cycle $d_{\!f\!f}^{dcm}$ is more complex. It is usually determined to depend on the input conductance $G_e$, the boost choke inductance L, the switching period T, the input voltage $V_{IN}$ and the output voltage $V_{OUT}$ as shown in equation II:

$$d_{\!f\!f}^{dcm} = \sqrt{\frac{2G_e L}{T} * \frac{V_{OUT} - V_{IN}}{V_{OUT}}} \qquad (II)$$

In a preferred embodiment of the invention, the boost converter is operated in a mixed conduction mode of operation. In this case, the ideal duty cycle is determined by considering the ideal duty cycles for a CCM as well as a DCM operation. This could be done in many ways such as for example to switch between both determination modes arbitrarily or with a given changing frequency. But the best results are achieved when the ideal duty cycle for the MCM is determined as the respective minimum of the two ideal duty-ratios $d_{\!f\!f}^{ccm}$ and $d_{\!f\!f}^{dcm}$ for the CCM or the DCM conduction modes. Accordingly, the prediction unit is preferably adapted to determine the correction signal such that the duty-ratio in a DCM/CCM mixed mode of operation is chosen to be a minimum of a duty-ratio in a DCM mode of operation and a duty-ratio of a CCM mode of operation.

Then the sampled boost choke current is corrected accordingly. This means that, since the ideal duty cycle depends on parameters which are not known exactly, they are error-controlled via an additional feedback loop. Due to noise immunity aspects, the resulting ideal duty cycle has to be processed before it can be added to the input of the current compensator.

The current feedback signal may in principle be any kind of signal representative of the converters output current. It could be the output current itself (or samples of it) that is fed to the current controller or it could be a signal that is derived from the output current.

In another preferred embodiment of the invention, the controller, in order to determine the current feedback signal, further comprises a sample correction. This sample correction is adapted to determine the current feedback signal based on the duty-ratio determined by the current controller and based on a current through an output choke of the switching power conversion device. Such converters may also include more than one output choke, in which case the sample correction device is preferably adapted to determine the current feedback signal based on a current through each output choke of the converter (if they differ from each other). A boost converter comprising two parallel boost stages is an example of a converter according to the invention having more than one output choke. In other topologies, a boost choke may be split into two or more parts that are arranged at different places of the converter.

Such a sample correction is provided because the current through the boost choke is usually sampled in the middle of the rising edge. Unlike during CCM, this sampled value differs during DCM from the average current. Hence, the sampled output current $i_{sample}$ has to be corrected during DCM to accurately reflect the average current $i_{AVG}$.

The current through the boost choke is usually sampled in the middle of the rising edge. Unlike during CCM, this sampled value differs during DCM from the average current. The sampled output current $i_{sample}$ is preferably corrected to determine the average current $i_{AVG}$ as follows:

$$i_{AVG} = k_{cor} * i_{sample}$$

where the correction factor $k_{cor}$ corresponds to the ratio between the conducting time of the diode and the whole switching cycle. For a piecewise constant switching frequency, piecewise constant input and boost voltages, the correction factor $k_{cor}$ can be determined from the duty-ratio d, the input voltage $V_{IN}$ and the output voltage $V_{OUT}$ as follows:

$$k_{cor} = \frac{d * V_{IN}}{V_{OUT} - V_{IN}}$$

For the determination of the corrected current samples, different information such as for example different current or voltage signals of either the controller itself or the converter can generally be considered by the prediction unit and preferably also by the sample correction, depending for example on the particular application or on the desired behaviour of the converter. In a preferred embodiment, the prediction unit is adapted to determine a predicted duty-ratio in a first step. In a second step the inverse function of the current controller is applied to the predicted duty-ratio such as to produce the correction signal to be added to the multiplier output.

In a further preferred embodiment, this predicted duty-ratio is also considered by the sample correction to determine the current feedback signal. Accordingly, as can be seen from the formula for determining the correction factor $k_{cor}$, the sample correction is preferably adapted to determine the current feedback signal further based on the duty-ratio d that is determined by the prediction unit instead of the duty cycle as determined by the current controller. The sample correction could also be adapted to consider both duty-ratios, i. e. the duty-ratio as determined by the current controller as well as the duty-ratio as determined by the prediction unit.

In another embodiment of the invention, the prediction unit is further adapted to determine a predicted mode signal that represents which mode of operation the converter is expected to work in. This predicted mode signal can then for example be provided to the sample correction which in this case is adapted to determine the current feedback signal further based on this predicted mode signal as provided by the prediction unit. By considering the expected mode of operation the sample correction can more efficiently and/or more accurately correct the current samples, in particular in DCM operation.

A controller as described above can be implemented as an analogue controller where some or all of the controller parts are realised by analogue elements. Such analogue designs usually are bulky and require a complex manufacturing process. In a preferred embodiment of the invention, the controller is therefore implemented as a digital controller, either as a digital controller designed from discrete parts or as a microprocessor or the like programmed accordingly. The implementation as a microprocessor is advantageous because an accordingly programmed processor is very easy to produce once the software exists. In case of such a digital controller the voltage controller, the multiplier, the current controller, the prediction unit and the sample correction are implemented as software. Since digital signal processors (DSPs) are very well suited and designed to process different signals, the controller is most preferably implemented as a DSP.

In the case of a digital controller it is to note that the processing of the signals is carried out at consecutive time intervals where previous values of certain signals form the basis for the determination of the next values. So it is clear for a person skilled in the art that the term duty-ratio as used in the claims may refer to different values in time of the duty-ratio. The claims as well as the description are therefore to be interpreted such that the duty-ratio for a given time interval is determined based on the duty ratio of a previous, for example the directly preceding step or even based on two or more previous values of the duty-ratio.

As already mentioned, the voltage controller output is determined based on several input signals. One of these input signals is based on a reference voltage.

It is in principle possible to adapt the voltage controller such that the reference voltage can directly be used as an input for the voltage controller. In a preferred embodiment of the invention, the voltage controller is however adapted to determine the voltage controller output based on a slew-rate of the reference voltage. Accordingly, the controller includes a block for determining the slew-rate of the reference voltage.

Another input signal of the voltage controller is a voltage feedback signal from the power output of the converter. Again it is possible to just connect the converter output directly to the voltage controller. However, in case of a digital controller it is however preferred that the voltage feedback signal includes voltage samples of the power output.

Analogously, the current feedback signal includes preferably current samples of the power output.

As outlined above, the multiplier determines the multiplier output based on the voltage controller output and the input voltage of the converter. In a further preferred embodiment of the invention, in addition to the voltage controller output, the multiplier uses two inputs that are based on the converter input signal to determine the multiplier output. One is the voltage samples of the input voltage and the other is a feedforward signal of the converter input voltage.

In another preferred embodiment, the controller further comprises an averaging unit that is adapted to determine an averaged input voltage signal from the input voltage that is provided to the input voltage feedforward which is adapted to determine the input voltage feedforward signal based on the averaged input voltage signal. The averaging unit reduces the influence of large and/or fast changes of the input voltage.

Every suitable averaging unit may be used, but advantageously, the averaging unit includes an EMA (exponential moving average).

In general, however, the multiplier may also be adapted to determine the multiplier output based on further or different information, such as for example any current or voltage signal of either the controller itself or the converter, depending for example on the particular application or on the desired behaviour of the converter.

A controller as described above can be used in a single or a multi-phase converter. In case of a multi-phase converter, the controller is preferably adapted to separately determine the duty-ratio for each phase of the converter. The term separately thereby does not mean that two distinct controllers are to be used—which may also be the case—but that the same controller determines the duty-ratio for each phase of the converter. In particular, some components of the controller are either provided several times, i. e. once per converter phase or they are provided only once and adapted to produce some signals once per phase. For example, the prediction unit is preferably adapted to produce a predicted duty-ratio and a separate correction signal per phase. And the controller includes a current controller and an adder per phase to add the respective correction signals to the multiplier output separately for each phase and feed the adder outputs to the respective current controllers. And of course each current controller determines a separate duty-cycle per phase that is fed to the PWM of each phase of the converter.

The converter can only work properly if the input voltage is in a certain range. If the input voltage is too small the controller preferably includes means such as certain soft- or hardware implemented modules that detect a too low input voltage and switch the converter or parts of it on or off accordingly. This can for example be done by enabling or disabling the converters PWM.

In order to protect the converter against an overvoltage, the converter usually includes a hardware implemented overvoltage protection. But in a preferred embodiment of the invention, the controller includes an overvoltage protection for enabling or disabling the pulse width modulator in dependency of the input voltage. As outlined above, the controller functionality is preferably implemented in software wherefore this overvoltage protection is also preferably implemented purely by software. This overvoltage protection can be provided either instead or in addition to other overvoltage protection devices of the converter.

The solution of the invention regarding the switching power conversion device is specified by the features of claim 13. A switching power conversion device with a pulse width modulator to switch the switches of the switching power conversion device on and off according to the invention simply includes a controller as described above for determining the duty-ratio for its pulse width modulator.

The solution of the invention regarding the method is specified by the features of claim 14.

The method for determining the duty-ratio for a pulse width modulator of a switching power conversion device includes determining a voltage controller output based on at least one of a reference voltage and a voltage feedback signal from the power output of the switching power conversion device and determining the duty-ratio based on the voltage controller output and a current feedback signal from the power output. According to the invention the method further includes determining a correction signal and adding the correction signal to the voltage controller output, where the correction signal is determined based on the duty-ratio, i. e. on the output of the current controller.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
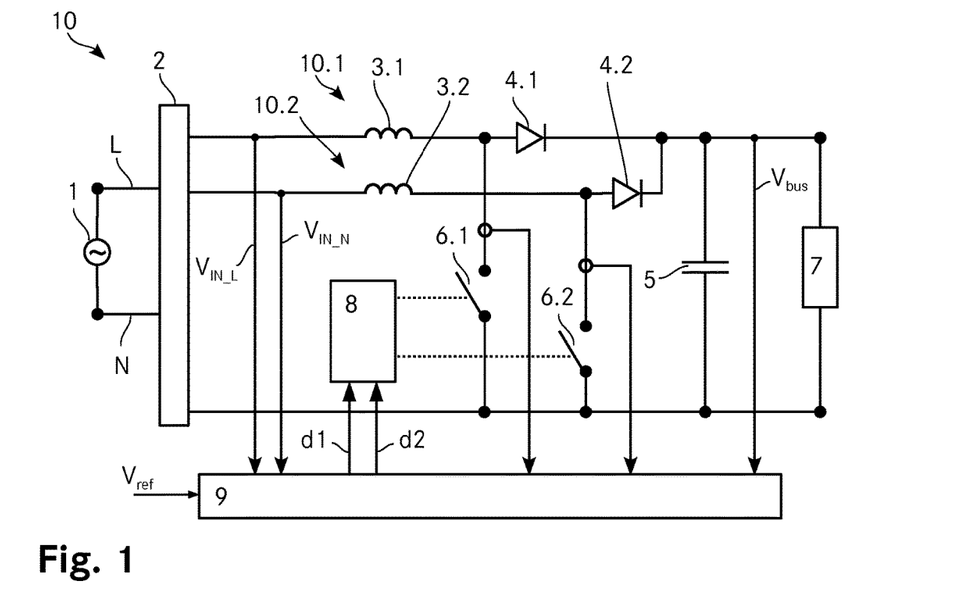
FIG. 1 A schematic depiction of a boost converter according to the invention.

FIG. 1 shows a schematic depiction of a boost converter 10 according to the invention that includes two interleaved PFC converters. The boost converter 10 converts an AC input voltage to a DC output voltage. The two lines N (neutral line) and L (phase line) of the boost converter 10 are connected to an AC input source 1. At the input, the boost converter 10 includes an input stage 2, which includes a rectifier and for example an EMI (electromagnetic interference) filter. The rectifier is for example a bridge rectifier such as a full bridge diode rectifier or any other suitable rectifier that provides a DC voltage at the output of the input stage 2. The input stage 2 is followed by the two interleaved boost stages 10.1, 10.2 that are connected in parallel and the phases of which are shifted by about 180°.

Each boost stage 10.1, 10.2 includes a boost inductance 3.1, 3.2 connected to the input stage 2, followed by a boost diode 4.1, 4.2 where the anode of each boost diode 4.1, 4.2 is connected to the boost inductance 3.1, 3.2. The cathode of the boost diodes 4.1, 4.2 is connected to a first terminal of an output capacitor 5 and the anode of both boost diodes 4.1, 4.2 is further connected to a second terminal of the output capacitor 5 via a switch 6.1, 6.2. The output bus voltage $V_{bus}$ of the boost converter is provided across the output capacitor 5 which is indicated by a load resistor 7. The second terminal of the output capacitor 5 is connected back to the input stage 2. The advantage of such an arrangement with two interleaved boost stages having a phase shift of about 180° is a reduction of the ripple of the output bus voltage $V_{bus}$.

The boost converter further 10 includes a pulse width modulator PWM 8 for generating the control signals for controlling the switches 6.1, 6.2. A controller 9 determines the duty-ratios d1, d2 and provides them to the PWM 8 which in turn accordingly generates the control signals for the switches 6.1, 6.2. In order to determine the duty-ratios d1, d2, the controller receives several input signals such as the input voltages $V_{IN\_L}$ of line L and $V_{IN\_N}$ of line N between the input stage 2 and the boost inductances 3.1, 3.2, the output currents $I_{sample1}$, $I_{sample2}$ through the switches 6.1, 6.2 as well as the output bus voltage $V_{bus}$ across the output capacitor 5. The controller 9 further receives a reference voltage $V_{ref}$ which the output voltage $V_{bus}$ of the boost converter should follow.

Controller 9 is shown to be just the controller for providing the duty-ratios d1, d2 for the PWM 8. It is however to be understood that the boost converter can include further controllers for controlling other functions of the converter, for example to provide the reference voltage $V_{ref}$. Although FIG. 1 shows a two phase boost converter, the invention is also applicable to single phase converters or multiphase converters with more than two phases as well which is very clear to one skilled in the art.

Figure 2:
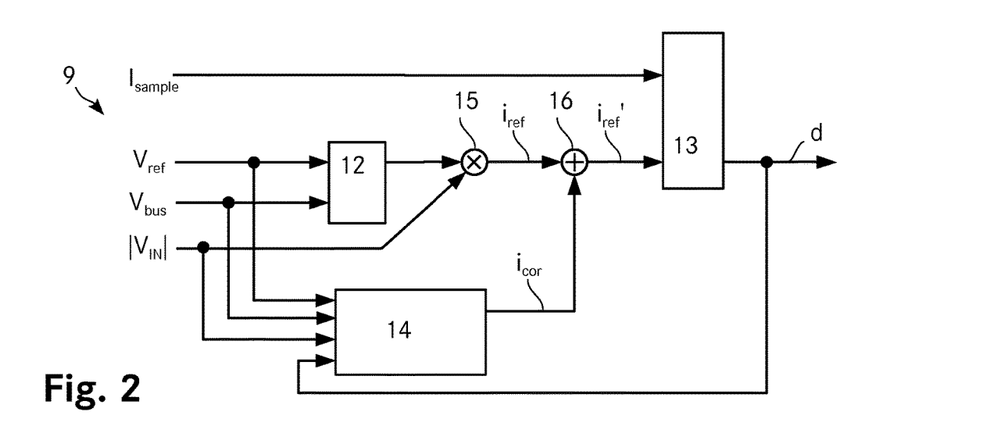
FIG. 2 a schematic depiction of a controller according to the invention.

FIG. 2 shows a schematic depiction of a controller 9 according to the invention which can for example be used in the boost converter as shown in FIG. 1 where for example the input signal $|V_{IN}|$ is to be understood to include both (rectified) input voltages $V_{IN\_L}$ and $V_{IN\_N}$, where the output duty-ratio d is to be understood to include both duty-ratios d1, d2 and where the output current $I_{sample}$ is to be understood to include both output currents $I_{sample1}$, $I_{sample2}$.

The controller 9 includes a voltage controller 12, a current controller 13 and a prediction unit 14. The voltage controller 12 receives the reference voltage $V_{ref}$ and the output bus voltage $V_{bus}$ and provides its output voltage to a multiplier 15. The multiplier 15 further receives the input voltage $|V_{IN}|$ and provides at its output a reference current $i_{ref}$ for the current controller 13. But this reference current $i_{ref}$ is corrected by adding a correction signal $i_{cor}$ to it by means of an adder 16. The correction signal $i_{cor}$ is determined by the prediction unit 14 based on the fed back duty-ratio d, the fed back bus voltage $V_{bus}$, the reference voltage $V_{ref}$ and the input voltage $|V_{IN}|$ which are received as input signals. It is to note that either the fed back bus voltage $V_{bus}$ or the reference voltage $V_{ref}$ is generally sufficient for the determination of the correction signal $i_{cor}$ but that the prediction unit 14 may consider both voltages.

The output of the adder 16 is the corrected reference current $i_{ref}'$ that is actually provided to the current controller 13. Based on this corrected reference current $i_{ref}'$ and the sampled output current $I_{sample}$ the current controller 13 determines the next duty-ratio d.

It is to note that some components shown in FIGS. 1 and 2 such as for example the PWM 8, the multiplier 15, the adder 16 or the prediction unit 14 may be provided twice whereas other components such as for example the voltage controller 12 are provided only once. However, more or less components may be provided twice. It is also possible, that a single DSP may be used to implement all of the necessary components. This is more likely the case if a fast DSP is used. On the other hand, for the implementation of the necessary components a second DSP or even further DSPs may be provided.

As previously mentioned, the duty-ratio is determined for the mixed conduction mode as the respective minimum for the continuous and the discontinuous conduction mode. Since the input voltage is rectified, we have to look just at a half period of it, i. e. to a range from 0° to 180° degrees of the input voltage.

Figure 3A:
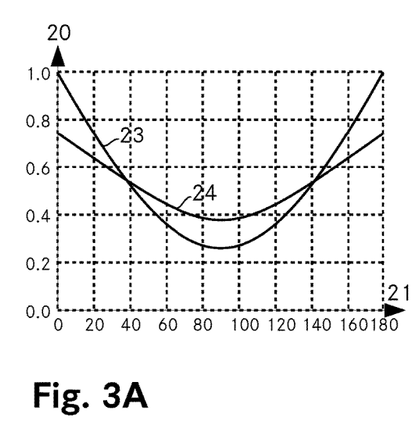
FIGS. 3A-3B are schematic depictions of the determination of the duty-ratio for the mixed conduction mode.

FIG. 3A shows the determination of the (ideal) duty-ratio 20 for CCM and DCM for the phase angle 21 from 0° to 180° according to equations I and II as previously mentioned. Line 23 denotes the duty-ratio for CCM and line 24 denotes the duty-ratio for DCM where the duty ratio can adopt values between 0 and 1.

Figure 3B:
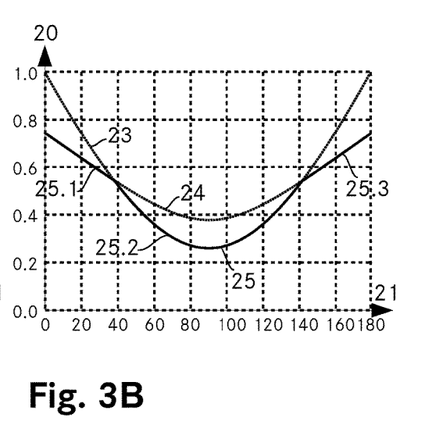

FIG. 3B shows the determination (or using another word: the prediction) of the duty-ratio 20 for the mixed conduction mode according to the invention. The solid line 25 shows how the duty-ratio is determined for each phase angle 21 between 0° and 180° for MCM. The solid line 25 consists of three parts where the first part 25.1 (phase angles from 0° to about 37°) and the third part 25.3 (phase angles from about 143° to 180°) correspond to the respective part of the DCM line 24 and where the second part 25.2 (phase angles from about 37° to about 143° corresponds to the respective part of the CCM line 23.

It is however to mention that the generation of the duty-ratio in DCM depends on the load and therefore line 24 may vary in dependency of the load. Depending on the load, the current drawn from the power source 1 will be different, i. e. it will be higher for higher loads. The dependency of the duty-ratio on the input current $I_{IN}$ can be seen if in equation II above, the conductance $G_e$ is replaced by the ratio $I_{IN}/V_{IN}$ of the input current to the input voltage V.

Figure 4:
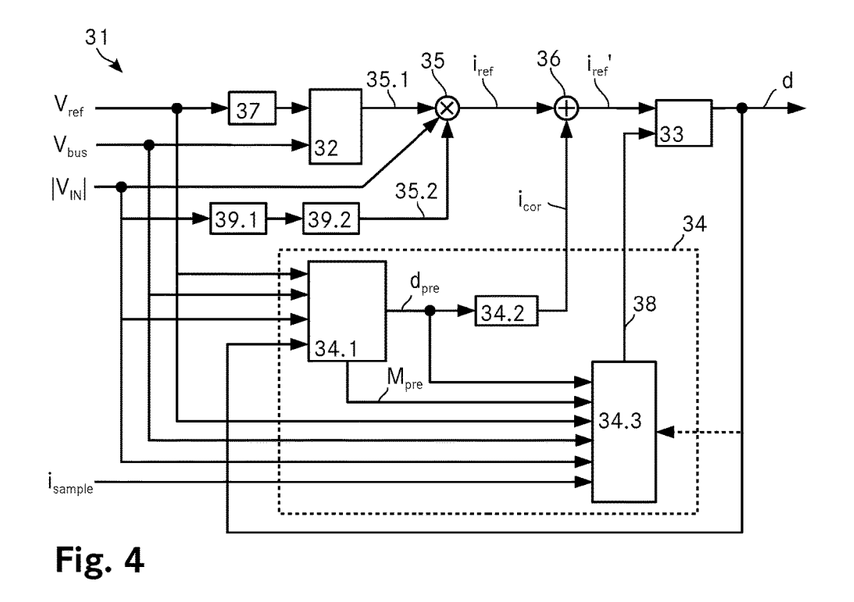
FIG. 4 a schematic, more detailed depiction of a controller according to the invention and FIG. 5 a schematic depiction of a part of another controller according to the invention.

FIG. 4 shows a more detailed depiction of another embodiment of a controller 31 according to the invention. The voltage controller 32 does not receive the reference voltage $V_{ref}$ directly but its slew rate which is determined by a slew rate unit 37. Further, the voltage controller 32 receives the samples of the boost or output bus voltage $V_{bus}$. The multiplier 35 multiplies the voltage controller output 35.1, the rectified input voltage $|V_{IN}|$ and the input voltage feedforward signal 35.2 determined from the averaged input voltage $|V_{IN}|$ which is done by an EMA filter 39.1 and the input voltage feedforward 39.2. The prediction unit 34 includes a duty-ratio calculation unit 34.1 which determines a predicted duty-ratio $d_{pre}$, an inverting unit 34.2 which determines the correction signal $i_{cor}$ by applying the inverse function of the current controller 33 to the predicted duty-ratio $d_{pre}$ and a sample correction unit 34.3 which determines a sample correction signal 38 for amending the current samples at the input of the current controller 33.

The correction signal $i_{cor}$ is added to the reference current $i_{ref}$ provided by the multiplier 35 by means of the adder 36.

The duty-ratio calculation unit 34.1 determines a further signal representing the predicted mode $M_{pre}$ in which the converter is expected to work. This predicted mode $M_{pre}$ is provided to the sample correction unit 34.3 which determines the correction signal $i_{cor}$ in dependency of it. Particularly, the sample correction unit 34.3 uses the predicted mode $M_{pre}$ to decide whether the converter works in DCM or CCM and accordingly, whether the correction signal $i_{cor}$ shall be corrected according to the equation above or not.

In addition to the reference voltage $V_{ref}$, the output bus voltage $V_{bus}$ and the duty-ratio d, the calculation unit 34.1 determines the predicted duty-ratio $d_{pre}$ further based on the input voltage $|V_{IN}|$. And the sample correction 34.3 further receives the predicted duty-ratio $d_{pre}$ as well as the samples of the output current $i_{sample}$, i.e. the current through the switches of the converter, for determining the sample correction signal 38. The sample correction 34.3 may further also consider the duty-ratio d provided by the current controller 33 which is shown by a dashed line.

The voltage controller 32 as well as the current controller 33 are for example controllers having two poles and two zero points.

Figure 5:
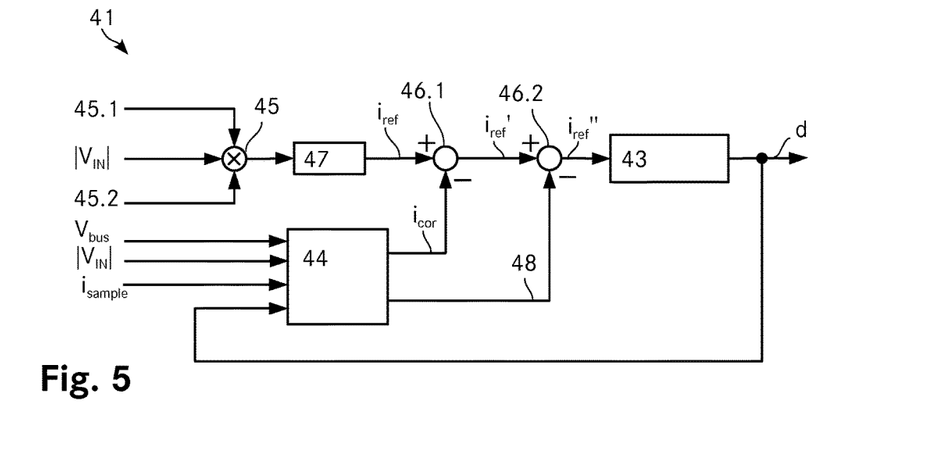

FIG. 5 shows the relevant part of a further controller 41 according to the invention. The multiplier 45 multiplies the voltage controller output 45.1, the input voltage $|V_{IN}|$ and the input voltage feedforward signal 45.2 as previously mentioned. The multiplier output is provided to the current determination unit 47 which determines the reference current $i_{ref}$ in dependency of the multiplier output such that the reference current $i_{ref}$ is between zero and the maximum allowed current $i_{max}$. The prediction unit 44 determines the correction signal $i_{cor}$ as well as the sample correction signal 48 where the correction signal $i_{cor}$ is added to the reference current $i_{ref}$ by means of a first adder 46.1 resulting in the corrected reference current $i_{ref}'$. By means of a second adder 46.2 the sample correction signal 48 is added this corrected reference current $i_{ref}'$ to provide the input reference current $i_{ref}''$ for the current controller 43.

As previously mentioned, the invention can also be applied in other converter topologies. The following table shows the determination of the duty-ratio for the different converter topologies to be realised by the respective prediction unit:

| converter topology | CCM: $d_{ff}^{ccm} =$ | DCM: $d_{ff}^{dcm} =$ |
|---|---|---|
| buck | $\dfrac{V_{OUT}}{V_{IN}}$ | $\sqrt{\dfrac{V_{OUT}}{V_{IN}}} * \sqrt{\dfrac{2*I_{OUT}*L}{T*(V_{IN}-V_{OUT})}}$ |

-continued

| converter topology | CCM: $d_{ff}^{ccm} =$ | DCM: $d_{ff}^{dcm} =$ |
|---|---|---|
| boost | $1 - \dfrac{V_{IN}}{V_{OUT}}$ | $\sqrt{1 - \dfrac{V_{IN}}{V_{OUT}}} * \sqrt{\dfrac{2*I_{IN}*L}{T*V_{IN}}}$ |
| buck-boost | $\dfrac{(-V_{OUT})}{(V_{IN} - V_{OUT})}$ | $\sqrt{\dfrac{(-V_{OUT})}{(V_{IN} - V_{OUT})}} * \sqrt{\dfrac{2*I_L*L}{T*V_{IN}}}$ |

As can be seen, the duty-ratio $d_{ff}^{ccm}$ for the CCM is determined in every case just based on the input voltage $V_{IN}$ and the output voltage $V_{OUT}$. For the determination of the duty-ratio $d_{ff}^{dcm}$ for the DCM the square root of $d_{ff}^{ccm}$ is determined and multiplied with another square root for the determination of which some further input values are needed such as the input current $I_{IN}$, the output current $I_{OUT}$, the switching period T, the inductance L of the boost choke and the current $I_L$ through the boost choke.

For the boost converter, the formula to determine the $d_{ff}^{dcm}$ corresponds to equation II, where the term $I_{IN}/V_{IN}$ is replaced by the input conductance $G_e$.

It is to note that the predicted duty-ratio again is the minimum of both duty-ratios for CCM and DCM respectively.

For these topologies, the correction factor $k_{cor}$ for the sample correction in CCM is always 1. For DCM $k_{cor}$ is to be determined as follows:

buck and PFC buck: $k_{cor} = d*V_{IN}/V_{OUT}$

Modelling and simulations of the controller according to the invention as well as the power stage of a boost converter (+/−10% tolerance of the nominal inductance value of 381 H, 208 Vac input voltage and 400V boost voltage) have shown a fast response of the error control. During a load step, the THD stays—after a short transient—permanently at a low level of less than 5%.

In summary, it is to be noted that an improved power factor correction using error-controlled duty cycle prediction with sample correction is presented. Since no hardware-specific parameters are used, its application is both, easy and flexible.

The invention claimed is:

1. A controller for a switching power conversion device, comprising:
   a voltage controller that determines a voltage controller output based on at least one of a reference voltage and a voltage feedback signal from a power output of the switching power conversion device;
   a current controller that determines duty-ratio for a pulse width modulator of the switching power conversion device;
   a prediction unit that determines a correction signal based on the duty-ratio such that the duty-ratio in a DCM (discontinuous conduction mode)-CCM (continuous conduction mode) mixed mode of operation is chosen to be a minimum of a duty-ratio of a CCM mode operation; and
   an adder that determines an adder output based on the correction signal and the voltage controller output,
   wherein the current controller determines the duty-ratio based on the adder output and a current feedback signal from the power output, and
   wherein the duty-ratio can adopt values between 0 and 1.

2. The controller according to claim 1, further comprising:
   a multiplier adapted to determine a multiplier output based on the voltage controller output and an input voltage of the switching power conversion device, wherein
   the adder is adapted to determine the adder output by adding the correction signal to the multiplier output.

3. The controller according to claim 1, adapted to determine a duty-ratio of an AC/DC boost converter.

4. The controller according to claim 1, wherein the prediction unit is adapted to determine the correction signal based on the duty-ratio and on at least one of the reference voltage and the voltage feedback signal.

5. The controller according to claim 4, wherein the prediction unit is adapted to determine the correction signal further based on the input voltage.

6. The controller according to claim 1, further comprising:
   a sample correction adapted to determine the current feedback signal based on the duty-ratio determined by the current controller and on a current through an output choke of the switching power conversion device.

7. The controller according to claim 1, wherein the controller is implemented as a digital controller and wherein the voltage controller, a multiplier, the current controller, the prediction unit and the sample correction are implemented as software.

8. The controller according to claim 1, wherein the voltage controller is adapted to determine the voltage controller output based on a slew rate of the reference voltage.

9. The controller according to claim 1, wherein the voltage feedback signal includes voltage samples of the power output and wherein the current feedback signal includes current samples of the power output.

10. The controller according to claim 1, further comprising:
    an input voltage feedforward adapted to determine an input voltage feedforward signal, where the multiplier is adapted to determine the multiplier output based on an input voltage and the input voltage feedforward signal.

11. The controller according to claim 10, further comprising:
    an averaging unit adapted to determine an averaged input voltage signal from the input voltage and where the input voltage feedforward is adapted to determine the input voltage feedforward signal based on the averaged input voltage signal.

12. The controller according to claim 1 for a switching power conversion device with multiple phases, adapted to determine a duty-ratio for each phase of the switching power conversion device.

13. The controller according to claim 1, including an overvoltage protection for enabling or disabling the pulse width modulator in dependency of the power.

14. A switching power conversion device, comprising:
    a controller according to claim 1.

15. A method for controlling a switching power conversion device, comprising:
    determining a voltage controller output based on at least one of a reference voltage and a voltage feedback signal from a power output of the switching power conversion device;
    determining a duty-ratio for a pulse width modulator based on the voltage controller output and a current feedback signal from the power output, wherein the duty-ratio can adopt values between 0 and 1;

determining a correction signal based on the duty-ratio such that the duty-ratio in a DCM (discontinuous conduction mode)-CCM (continuous conduction mode) mixed mode of operation is chosen to be a minimum of a duty-ratio in a DCM mode of operation and a duty-ratio of a CCM mode operation; and adding the correction signal to the voltage controller output.

16. The controller according to claim 2, adapted to determine a duty-ratio of an AC/DC boost converter.

17. The controller according to claim 2, wherein the prediction unit is adapted to determine the correction signal based on the duty-ratio and on at least one of the reference voltage and the voltage feedback signal.

18. The controller according to claim 3, wherein the prediction unit is adapted to determine the correction signal based on the duty-ratio and on at least one of the reference voltage and the voltage feedback signal.

19. The controller according to claim 2, wherein the prediction unit is adapted to determine the correction signal such that the duty-ratio in a DCM (discontinuous conduction mode)-CCM (continuous conduction mode) mixed mode of operation is chosen to be a minimum of a duty-ratio in a DCM mode of operation and a duty-ratio of a CCM mode of operation.

* * * * *